Patented Jan. 16, 1945

2,367,436

UNITED STATES PATENT OFFICE 2,367,436

PROCESS FOR THE MANUFACTURE OF
β-ALANIN

Paul Ruggli and Albert Businger, Basel, Switzerland, assignors to Hoffmann-La Roche Inc., Nutley, N. J., a corporation of New Jersey No Drawing. Application August 26 1942, Serial No. 456,292. In Switzerland December 16, 1941

9 Claims. (Cl. 260—534)

β-Alanin can be obtained synthetically in various ways. One such way is the treatment of succinic acid imide with hypobromides. Lately, cyanoacetic ester was catalytically hydrogenised to β-alanin ester ("Berichte der deutschen Chemischen Gesellschaft," vol. 74, year 1941, page 256). In accordance with a brief indication in "Berichte der deutschen Chemischen Gesellschaft," vol. 8, year 1875, page 1597, β-alanin is also said to result from reduction of cyanoacetic acid with zinc and sulfuric acid. However, all these methods are not suitable for the technical production of β-alanin.

It has now been found that β-alanin can be obtained with excellent yield by a method, which can easily be carried out technically, by hydrogenising cyanoacetic acid salts in ammoniacal solution in presence of a nickel catalyst. The working can proceed in aqueous as well as in alcoholic solution. It is of advantage to use the cyanoacetic acid alkali salts, especially the potassium salt, as in this case the subsequent separation of the alkali occurs in a very simple manner.

The advantage of the new process over the known methods for preparing β-alanin are obvious. On the one hand, cyanoacetic acid and its salts are easily accessible. As compared with the preparation from cyanoacetic ester, the principal progress is not so much to be found in the use of salts of cyanoacetic acid than in the possibility to employ nickel catalysts instead of the expensive platinum oxide, which is required when hydrogenising the ester in acid solution. Moreover, the working according to the new process can take place in alkaline solution which simplifies the question of vessels to a great extent.

The hydrogenation of cyanoacetic acid or of its salts in ammoniacal solution with a nickel catalyst proceeds very quickly when using high pressure. But it also succeeds under ordinary or slightly elevated pressure; in this case, however, it proceeds considerably more slowly. Also the temperature can vary within wide margins, the increasing of the same not causing substantially more than acceleration.

Example 1

61.5 parts by weight of potassium cyanoacetate are hydrogenised in a stirring autoclave with 500 parts by volume of 18 per cent ammoniacal methyl alcohol, 5 parts by weight of Raney nickel and hydrogen. At 100 atmospheres and 90° C. the calculated quantity of hydrogen is taken up in about 15 minutes. After filtering off the catalyst, the filtrate is evaporated in vacuo to one-fifth of its volume, then treated with 35 parts by weight of glacial acetic acid and 100 parts by weight of water and evaporated almost to dryness. If alcohol is now added, β-alanin immediately begins to precipitate; it is absolutely pure after a single recrystallisation. The yield exceeds 75 per cent of the theoretical.

Example 2

21.25 parts by weight of cyanoacetic acid are dissolved in 250 parts by weight of 28 per cent aqueous ammonia, treated with 5 parts by weight of a nickel catalyst and hydrogenised. After filtering off the nickel and removing the dissolved nickel with hydrogen sulfite, β-alanin is obtained on evaporation of the filtered aqueous solution.

Example 3

42.6 parts by weight of cyanoacetic acid are dissolved in 50 parts by weight of water and neutralised with potassium hydroxide of 50 per cent. After addition of 450 parts by weight of 30 per cent aqueous ammonia and 20 parts by weight of a nickel catalyst, the product is hydrogenised in a shaking autoclave at 30 atmospheres and 20° C. After completion of the reduction (4 to 5 hours) and removal of the catalyst, the product is partly evaporated and treated with 45 parts by weight of glacial acetic acid. The crystallisation of β-alanin from the further concentrated solution occurs on addition of alcohol.

We claim:

1. Process for the manufacture of beta-alanine which comprises dissolving a substance selected from the group consisting of cyanoacetic acid and the salts thereof in a hydroxylated solvent selected from the group consisting of water and alcohols and hydrogenizing said solution under alkaline conditions in the presence of ammonia and of a nickel catalyst.

2. Process for the manufacture of beta-alanine which comprises dissolving a substance selected from the group consisting of cyanoacetic acid and the salts thereof in a hydroxylated solvent selected from the group consisting of water and alcohols in the presence of a sufficient quantity of ammonia to obtain an alkaline reacting solution, and hydrogenizing said solution in the presence of a nickel catalyst.

3. Process for the manufacture of beta-alanine which comprises dissolving an alkali metal salt of cyanoacetic acid in a hydroxylated solvent selected from the group consisting of water and alcohols, and hydrogenizing said solution under alkaline conditions in the presence of ammonia and of a nickel catalyst.

4. Process for the manufacture of beta-alanine which comprises dissolving an alkali metal salt of cyanoacetic acid in a hydroxylated solvent selected from the group consisting of water and alcohols in the presence of a sufficient quantity of ammonia to obtain an alkali reacting solution, and hydrogenizing said solution in the presence of a nickel catalyst.

5. Process for the manufacture of beta-alanine which comprises dissolving the potassium salt of cyanoacetic acid in a hydroxylated solvent selected from the group consisting of water and alcohols, and hydrogenizing said solution under alkaline conditions in the presence of ammonia and of a nickel catalyst.

6. Process for the manufacture of beta-alanine which comprises dissolving the potassium salt of cyanoacetic acid in a hydroxylated solvent selected from the group consisting of water and alcohols in the presence of a sufficient amount of ammonia to obtain an alkaline reacting solution, and hydrogenizing said solution in the presence of a nickel catalyst.

7. Process for the manufacture of beta-alanine which comprises dissolving potassium cyanoacetate in 18 per cent ammoniacal methyl alcohol and hydrogenating the solution in the presence of Raney nickel as a catalyst.

8. Process for the manufacture of beta-alanine which comprises dissolving cyanoacetic acid in 28 per cent aqueous ammonia, and hydrogenizing the solution in the presence of a nickel catalyst.

9. Process for the manufacture of beta-alanine which comprises dissolving cyanoacetic acid in water, neutralizing the solution with potassium hydroxide, adding 30 per cent aqueous ammonia to the solution and hydrogenizing the solution in the presence of a nickel catalyst.

PAUL RUGGLI.
ALBERT BUSINGER.